United States Patent [19]
Pfister

[11] 4,153,264
[45] May 8, 1979

[54] GOLF CART

[76] Inventor: William J. Pfister, 1136 Outwest, Prescott, Ariz. 96301

[21] Appl. No.: 860,843

[22] Filed: Dec. 15, 1977

[51] Int. Cl.² .............................................. B62B 1/12
[52] U.S. Cl. ................................. 280/38; 280/47.26; 280/DIG. 6
[58] Field of Search ........... 280/47.26, 47.18, DIG. 6, 280/38, 40, 641, 639

[56] References Cited

U.S. PATENT DOCUMENTS

| | | | |
|---|---|---|---|
| 2,470,272 | 5/1949 | Trimmer | 280/DIG. 6 |
| 2,575,930 | 11/1951 | Schwartz | 280/DIG. 6 |
| 2,726,874 | 12/1955 | Sullivan | 280/DIG. 6 |
| 3,165,329 | 1/1965 | Liibe | 280/DIG. 6 |

FOREIGN PATENT DOCUMENTS

| | | | |
|---|---|---|---|
| 250251 | 2/1963 | Australia | 280/DIG. 6 |
| 327792 | 4/1930 | United Kingdom | 280/DIG. 6 |
| 762002 | 11/1956 | United Kingdom | 280/DIG. 6 |
| 800918 | 9/1958 | United Kingdom | 280/DIG. 6 |

*Primary Examiner*—John A. Pekar
*Attorney, Agent, or Firm*—Drummond and Nelson

[57] ABSTRACT

A golf cart of the manual pull type having a main vertical frame member to which a golf bag is attached. A pair of wheel assemblies are clamped to the main frame member at opposite sides of the frame. Each wheel assembly includes a transverse shaft attached to the frame and an axle mounted wheel. The wheel axle is offset from the shaft through a detent mechanism. In the stored position, the wheel assemblies are removable and the shaft can be folded to a position alongside the wheel. In another embodiment, the wheel is clamped to the main axle and in a stored position, the wheels are detachable and the main shaft can be pivoted to a position parallel to the main frame member.

4 Claims, 13 Drawing Figures

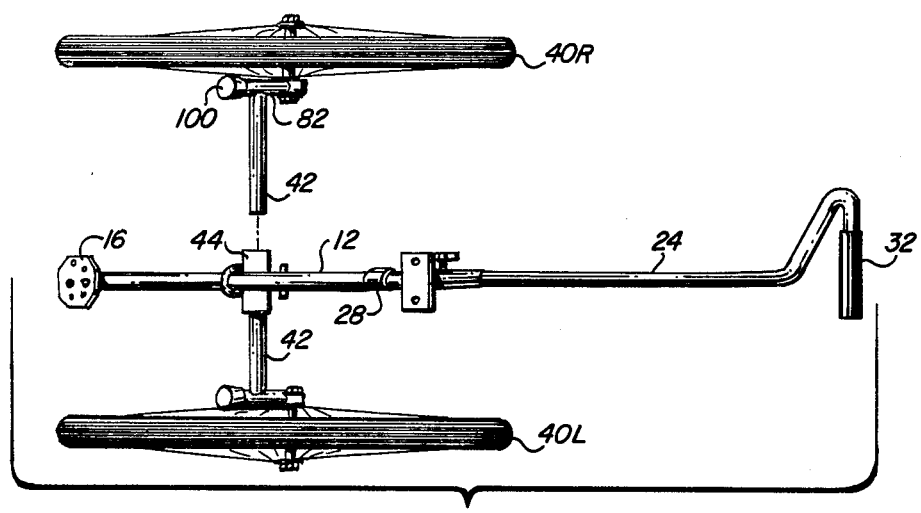
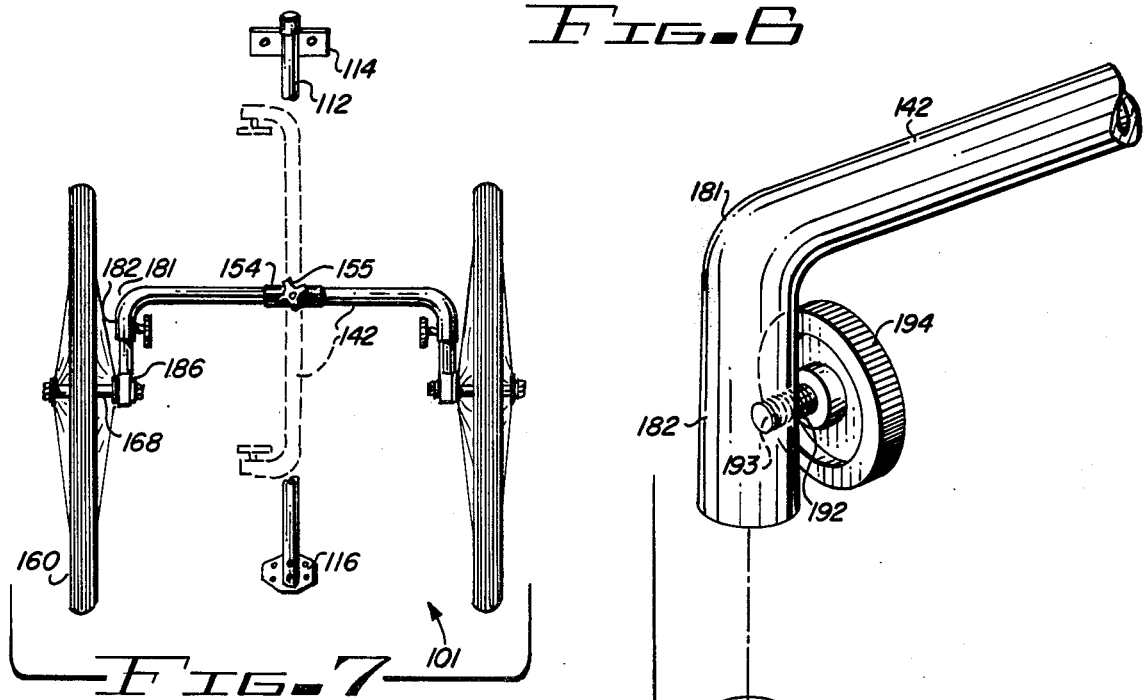
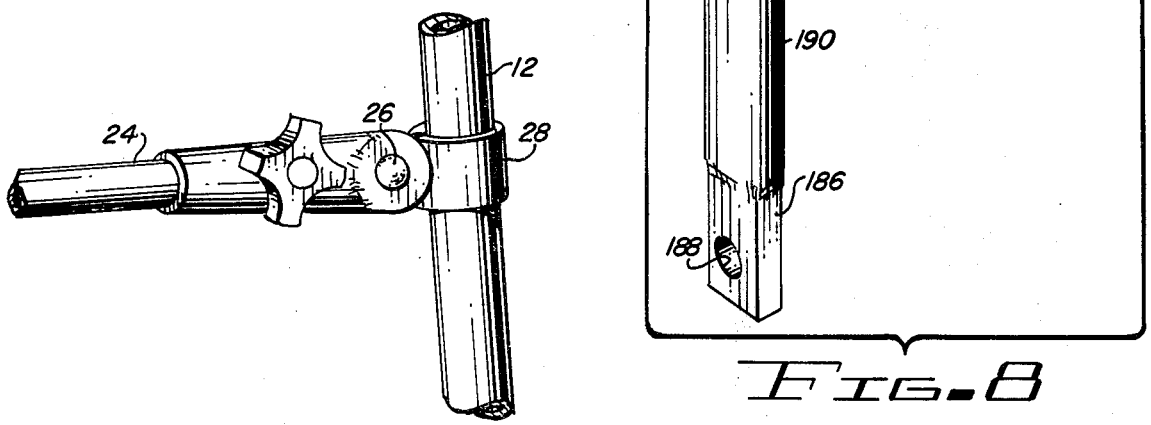

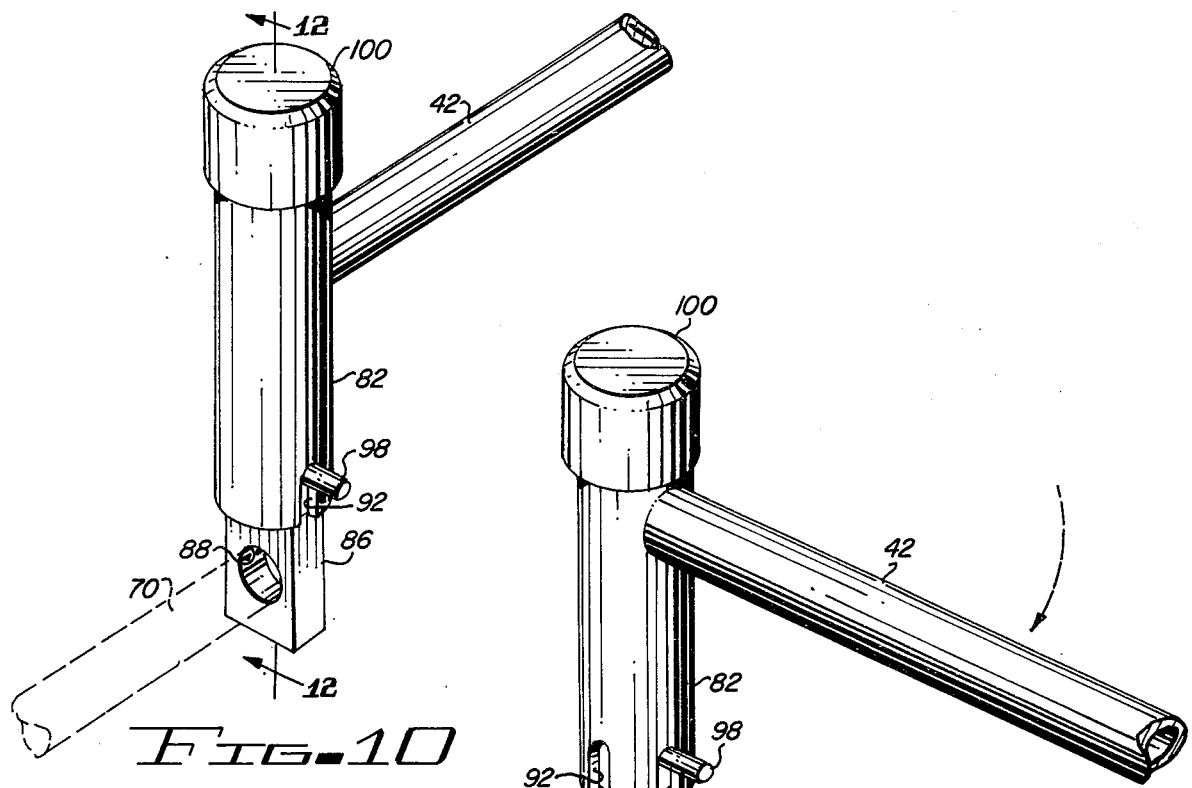
FIG-10
FIG-11
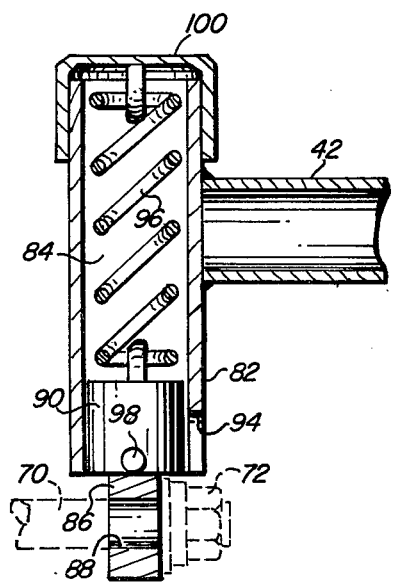
FIG-12
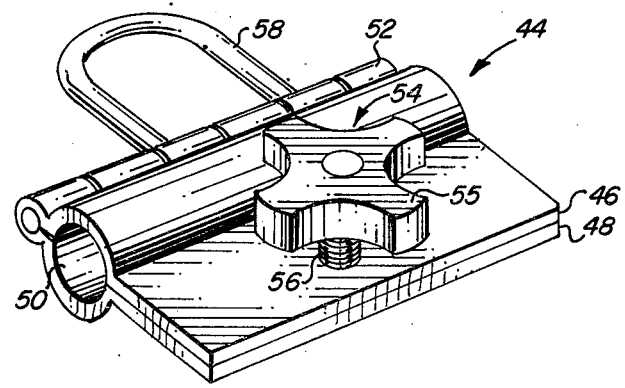
FIG-13

GOLF CART

The present invention relates to a cart and more particularly relates to a cart of the type adapted for attachment to a golf bag and which is manually wheeled by the golfer and which can be disassembled to a stored condition.

Golf is a sport which has an ardent following throughout the world. In addition to the selections of clubs ordinarily used by a golfer, golfers traditionally carry accessory paraphernalia such as unbrellas, additional sportswear in the event of changes in weather, extra golf balls and the like. Accordingly, most golf bags are designed having a main compartment for the reception of clubs and additional compartments or pockets for various accessories as mentioned. A complete golf bag carrying the sixteen golf clubs permitted under U.S.G.A. rules as well as accessories can be quite bulky and heavy.

Many golfers, due to the size and weight of the golf bag, prefer to play a round of golf utilizing a gas powered or electrically powered golf cart vehicle. Other golfers prefer to walk the golf course in order to obtain the healthful benefit of exercise and to more fully enjoy the game. Golfers who prefer to walk the golf course are faced with the choice of carrying their clubs, which can become tedious and tiring, or transporting the bag, golf clubs and accessories on a cart of the type generally known as a pull-cart.

Pull carts generally include a frame member with a pair of wheels and a handle. The golf bag can be detachably secured to the frame. In improved versions of the golf carts, the carts are collapsible generally having a pair of wheels which can be moved from a collapsed position adjacent to the frame to an extended position by means of arms or support members slidably or pivotally attached to the main tubular frame. Devices of this type are shown in U.S. Pat. Nos. 3,223,430, 2,648,545, and 2,793,871.

The disadvantage of pull golf carts of the general type, even those that are collapsible, is that they are relatively heavy. Even in the collapsed position, the cart requires considerable storage space, making it difficult to place in a storage area or in an automobile. Further, carts of this type generally utilize relatively small wheels, making it difficult to pull the cart over terrain which may be rocky or bumpy.

Accordingly, it is the object of the present invention to provide a novel and unique cart for transporting a golf bag which is lightweight, easily manueverable, and which can be disassembled to a compact condition for storage. The golf cart of the present invention includes a main vertical frame member which is attachable to a conventional golf bag. A cross-frame member or shaft is secured to the vertical frame member at an intermediate location at a clamp. The opposite ends of the cross-frame member support a wheel assembly including a vertical stub shaft which cooperates with a connector attachable to the axle of a large diameter, ground engaging wheel such as a bicycle wheel. The wheel assemblies consisting of the cross-frame member, stub shaft, connector and wheel may be removed from the vertical frame member by disengagement at the clamp at the vertical frame member. A detent mechanism associated with the stub shaft and the connector allows the stub shaft and cross-frame member to be pivoted or folded to a position along side the wheel in a position of non-use.

In an alternate embodiment of the present invention, the cross-frame member comprises a unitary member which is pivotally attached to the vertical frame member. A connector element is secured to the axle of each wheel and is slidably received in the ends of the cross-frame members and is detachably secured by fastener means such as a wing nut or a bolt.

The above and other objects and advantages of the present invention will become more apparent from the following description, claims and drawings in which:

FIG. 6 is a top view of the golf cart of the present invention;

FIG. 7 is a rear view illustrating another embodiment of the present invention;

FIG. 8 is an exploded view showing the details of a portion of the axle assembly of the embodiment of FIG. 7;

FIG. 9 is a detail view showing the attachment of the handle to the main frame of the golf cart;

FIGS. 10 and 11 are perspective views illustrating the axle detent mechanism of the embodiment shown in FIG. 1;

FIG. 12 is a sectional view illustrating the detent mechanism associated with the axle stub shaft and connector mechanism as shown in FIGS. 10 and 11; and FIG. 13 is a perspective view illustrating the clamp attached to the main vertical frame member.

Figure 1:
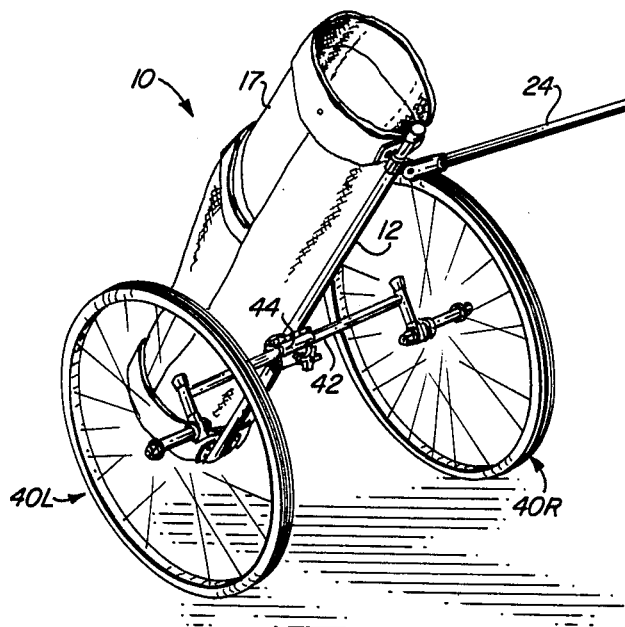
FIG. 1 is a perspective view of a preferred embodiment of the golf cart of the present invention showing a golf bag secured to the golf cart.

Turning now to the drawings, the preferred embodiment of the present invention is illustrated in FIGS. 1 to 7.

The present invention is generally designated by the numeral 10 and includes a main vertical frame member 12 which, for example, may be a tubular aluminum member. Mounting plates 14 and 16 are secured to the vertical frame member 12 near the top and bottom end of the member respectively. A conventional golf bag 17 is carried on frame member 12 and is secured by appropriate fasteners 20 extending through the upper and lower annular flanges on golf bag 7 at mounting plates 14 and 16. In this way, the bag and frame are a secured unitary structure. It will be obvious to those skilled in the art that other means of mounting the golf bag can be used. For example, a base plate can be secured to the lower end of the shaft 12 at generally right angles to the shaft on which the bottom of the bag may rest. A shock cord or similar elastic member can be used to secure the bag to the frame.

An elongate handle 24 is attached at its terminal end at pivot 26 to ring 28 which is secured to frame member 12 as best seen in FIG. 9. Adjustment of handle 24 permits the relative angularity of the handle with respect to the frame to be varied in accordance with the requirement of the user. The end of handle 24 terminates at a conventional grip 32.

Figure 2:
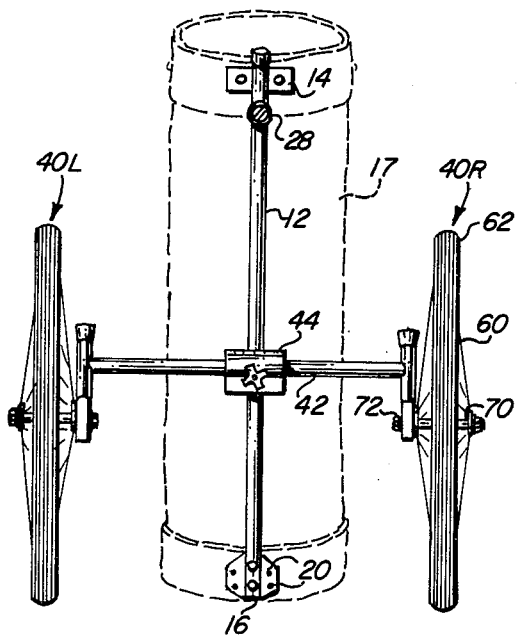
FIG. 2 is a rear view of the golf cart of the present invention with a golf bag being shown in dotted.
Figure 3:
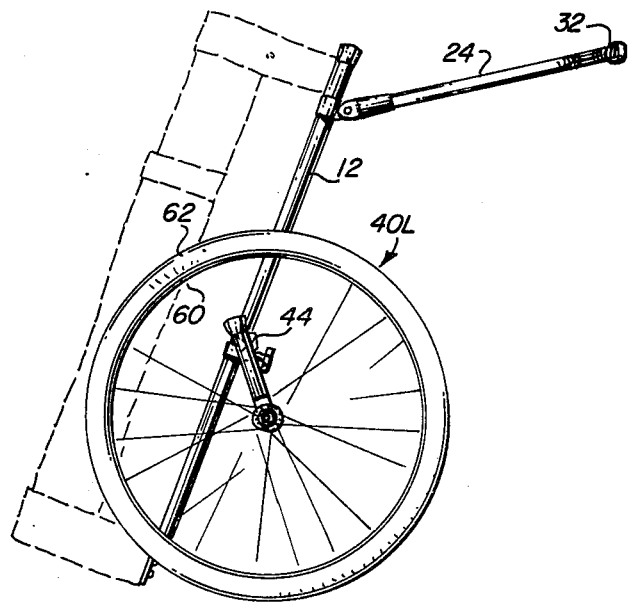
FIG. 3 is a side view of the golf cart.

In a position of use as best seen in FIGS. 1, 2 and 6, a pair of wheel assemblies 40R and 40L are detachably secured to the vertical frame member 12 at clamp 44. Clamp 44 is shown in detail in FIG. 13 and includes oppositely disposed plates 46 and 48 which are joined at hinge section 52 extending along one longitudinal edge of the plates. Plates 46 and 48 are formed defining a generally cylindrical transverse section 50 for reception of a portion of the wheel assemblies as will be explained hereafter. Tightener 54 shown in the form of a handle 55 and shank 56 in threaded engagement with plates 46 and 48 so as the plates may be tightened in the clamped position shown in FIG. 13 or loosened to permit disassembly of the cart as will be explained. U-bolt 58 projects from the underside of plate 48 for securement to the vertical shaft 12 at an appropriate location.

The wheel assemblies 40R and 40L are identical and interchangeable so detailed description of one is deemed sufficient. Wheel assembly 40R includes a large diameter pneumatic tire 62 mounted on a wheel rim 60. Radial spokes 66 extend to a center hub 68 which carries convention axle 70 mounted in appropriate bearings such as roller or ball bearings. The inner end of axle 70 is threaded and carries a nut 72.

A cross-frame or shaft member 42 supports axle 70 and is detachably secured to main frame member 12 at plate 44. Cross-frame member 42 which may be of tubular stock or any other convenient structural shape. A generally hollow stub shaft 82 is secured to the outer end of shaft 42 forming a general right angle with shaft 42. Stub shaft 82 defines a cylindrical interior bore 84 which slidably receives connector member 86. The outer end of connector member 86 is provided with a bore 88 which receives the threaded portion of axle 70 and is secured to the axle by nut 72.

Figure 4:
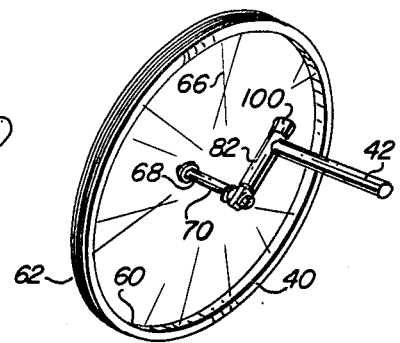
FIG. 4 is a perspective view of one of the wheel assemblies of the golf cart showing the axle assembly in a position for securement to the main vertical frame member.
Figure 5:
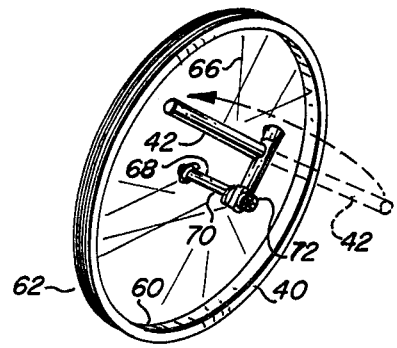
FIG. 5 is a perspective view of a wheel assembly of one wheel assembly of the golf cart of the present invention showing the axle assembly in a storage position.

The details of the stub shaft and connector are best seen in FIG. 12. Stub shaft 82, as pointed out above, defines a hollow interior bore 84. Connector 86 has an upper cylindrical section 90 slidable within bore 84. A pair of notches 92 and 94 are provided at the lower end of shaft 82. A detent pin 98 extends from connector member 86. Biasing spring 96 extends within bore 84 of shaft 82 secured at its upper end to cap 100 on stub shaft 82 and at its lower end to the top end of connector 86 at eye fasteners as shown. As shown in FIGS. 10 and 11, shaft 42 can be pivoted 90° with respect to connector 86 depending upon which notch, either 92 or 94, is engaged at detent pin 92. This allows the cross shaft to be "folded" from a position of use as shown in FIG. 4 to a stored position as shown in FIG. 5 with respect to the associated wheel 40R or 40L.

The operation, advantages and features of the present invention will become more apparent from the following description of operation.

Conventional golf bag 17 having a cylindrical compartment for reception of golf clubs including exterior pockets for accessories is attached to the main vertical frame 12 of the golf cart 10 by securing the upper and lower fastener plates 14 and 16 to the upper and lower annular frame members of the bag by fasteners 20. The wheel assemblies 40R and 40L are assembled to the extended position shown in FIGS. 1, 2 and 3 by exerting an upward force on stub shaft 82 and pivoting the stub shaft and shaft 42 to a position parallel with axle 70 as shown in FIG. 10. Detent pin is engaged in slot 92. Handle 55 is loosened and the inner end of shaft 42 of each of the wheel assemblies 40R and 40L is inserted into the cylindrical channel 50 at clamp 44. The clamp is tightened and the cart is fully assembled as shown in FIGS. 1 and 2.

To disassemble the cart, clamp 44 is loosened by turning handle 55. Wheel assemblies 40R and 40L are removed by pulling them from clamp 44. The wheel assemblies are folded to the stored position by exerting an upward force on stub shaft 82 and pivoting the stub shaft so the shaft 42 assumes the position shown in FIG. 5 with detent pin 98 engaged in slot 94 as shown in FIG. 11. The main frame carrying the bag and the two wheel assemblies may be conveniently stored as three separate components.

The large diameter wheels give a smooth ride over rough terrain reducing the effort required to pull a cart and also dampen bumps. Further, the fact that the shaft 42 and the wheel axle 70 are vertically offset from one another increases the overall stability of the device by raising the point at which the bag is pivoted to near the center of the golf bag without having to use inordinately large diameter wheels.

FIGS. 7 and 8 illustrate another embodiment of the present invention generally designated by the numeral 101. In this embodiment the attachment of the wheels is by means of a fastener rather than by a detent mechanism as previously shown. Embodiment 100 is provided with a generally vertical frame member 112 which is adapted to be secured to a golf bag at mounting plates 114 and 116 located at the upper and lower end of the member respectively. A tubular bracket 154 is pivotally attached to frame member 112 intermediate the ends of the member. Bracket 154 can be locked in either a horizontal or vertical position by adjustment of locking handle 155. A unitary cross shaft 142 extends through member 154 and projects in a horizontal position to a location beyond the outer extremities of the golf bag. The opposite outer ends of cross member 180 are formed having a bight section 181 terminating a stub shaft 182. Stub shaft 182 has an internal bore which receives the upper cylindrical end 190 of conductor member 186 as seen in FIG. 8. Connector member 186 is secured to the axle 168 of a conventional wheel 160 such as a bicycle wheel at bore 188. A threaded bore 193 is provided in the side wall of stub shaft 182 and receives threaded member 192. The outer end of threaded member 192 carries a handle 194. This permits connector 186 to be inserted within stub shaft 182 and locked in place by tightening handle 194.

To disassemble the unit, handle 194 is loosened and connector 186 is slipped from the stub shaft 182 along with the attached wheel 160. Handle 155 is loosened and the shaft is pivoted to a vertical position as shown in dotted in FIG. 7. In this position, the golf cart and the separate wheel assemblies may be conveniently stored as separate components. In the event the golfer should desire to not use the cart of the invention, the main frame member may remain attached to the bag with no interference or inconvenience.

From the foregoing, it will be seen that the present invention provides a convenient, lightweight and easily oeprable golf cart. The golf cart of the present invention will fit almost any conventional golf bag. The large wheels provide a stable ride and makes the cart easy to pull across the terrain of a golf course. The large wheels can be easily removed so that the wheels and bag can be stored separately from the bag for efficiency of storage. It will be obvious that any of a variety of materials such as tubular aluminum or steel can be used.

It will be obvious to those skilled in the art to make various changes, alterations or modifications to the invention described herein. To the extent the changes, alterations or modifications do not depart from the spirit and scope of the pending claims, they are intended to be encompassed therein.

I claim:

1. A cart for the manual transportation of a golf bag comprising:
   (a) a main frame member having fastener means associated therewith for securing the frame to a golf bag;
   (b) clamp means secured to said main frame member at a generally intermediate position along said frame;
   (c) a pair of cross frame members each having first and second ends, said first ends being detachably securable in a position of use at said clamp member and said cross frame members being in a generally transverse position to said main frame member in said position of use;
   (d) a pair of wheels rotatable about an axle disposed at opposite sides of said frame member supported on the second ends of said cross frame members; and
   (e) attachment means interconnecting said wheel axles and said cross frame members, each of said attachment means comprising:
      (i) a generally vertical tube extending between the second end of said cross members and said wheel axles; and
      (ii) pivot means associated therewith having first and second positions whereby said cross frame member can be positioned substantially parallel to said wheel axle in a first position and secured to said clamp means at said first end in a position of use and whereby said cross frame member can be detached from said main frame and said cross frame pivoted to a position generally perpendicular to said axle along side the wheel in a second position in a storage position.

2. The golf cart of claim 1 wherein said pivot means comprises detent means including biasing means within said tube, said tube defining spaced-apart first and second notches therein, and connector means rotatable within said tube and held therein by said biasing means and secured to said axle and having radially projecting pin means secured thereto whereby said pin means may be engaged in said first notch in said first position and whereby said connector means may be moved to said second position with said pin in said second notch.

3. The golf cart of claim 2 wherein said wheels are of the bicycle type having a diameter at least approximately as great as one half the length of said main frame member.

4. The golf cart of claim 2 further including an elongate handle means pivotally connected to said main frame member.

* * * * *